United States Patent [19]

Jaccard et al.

[11] 4,287,642
[45] Sep. 8, 1981

[54] MEAT TENDERIZING APPARATUS

[76] Inventors: Andre R. Jaccard, 10969 Darien Rd., Holland, N.Y. 14080; Karl H. Voss, 6781 Ward Rd., Wheatfield, N.Y. 14304

[21] Appl. No.: 974,032

[22] Filed: Dec. 28, 1978

[51] Int. Cl.³ .............................................. A22C 7/00
[52] U.S. Cl. ...................................................... 17/25
[58] Field of Search ............... 17/25, 30; 83/691, 132, 83/136, 140

[56] References Cited

U.S. PATENT DOCUMENTS

| | | | |
|---|---|---|---|
| 1,202,496 | 10/1916 | Ericksen | 17/30 |
| 1,996,949 | 4/1935 | Bosworth et al. | 17/30 |
| 2,160,676 | 5/1939 | Richard | 83/140 |
| 2,163,641 | 6/1939 | Wales | 83/140 X |
| 2,612,853 | 10/1952 | Bale, Jr. | 83/140 X |
| 2,830,317 | 4/1958 | Fleiss | 17/25 |
| 3,727,267 | 4/1973 | Clark | 17/25 |
| 3,772,737 | 11/1973 | Fleiss | 17/30 |
| 3,842,464 | 10/1974 | McCord | 17/25 |
| 4,027,356 | 6/1977 | Wagner et al. | 17/25 |
| 4,055,872 | 11/1977 | Wagner | 17/25 |
| 4,086,683 | 5/1978 | Davis | 17/25 |
| 4,169,300 | 10/1979 | McCullough | 17/25 |

*Primary Examiner*—Willie G. Abercrombie

[57] ABSTRACT

Meat tenderizing apparatus comprising a vertically reciprocatable ram mechanism which carries a plurality of meat-piercing elements. Each of said elements is individually mounted and is provided with separate guiding means and with individual meat stripping means adapted to be moved with said element to engage a cut of meat to be tenderized and to be held against said cut of meat during withdrawal of said element. Means is provided on said ram mechanism for individually releasing any piercing element that encounters a hard substance such as a bone in penetrating said cut of meat.

20 Claims, 30 Drawing Figures

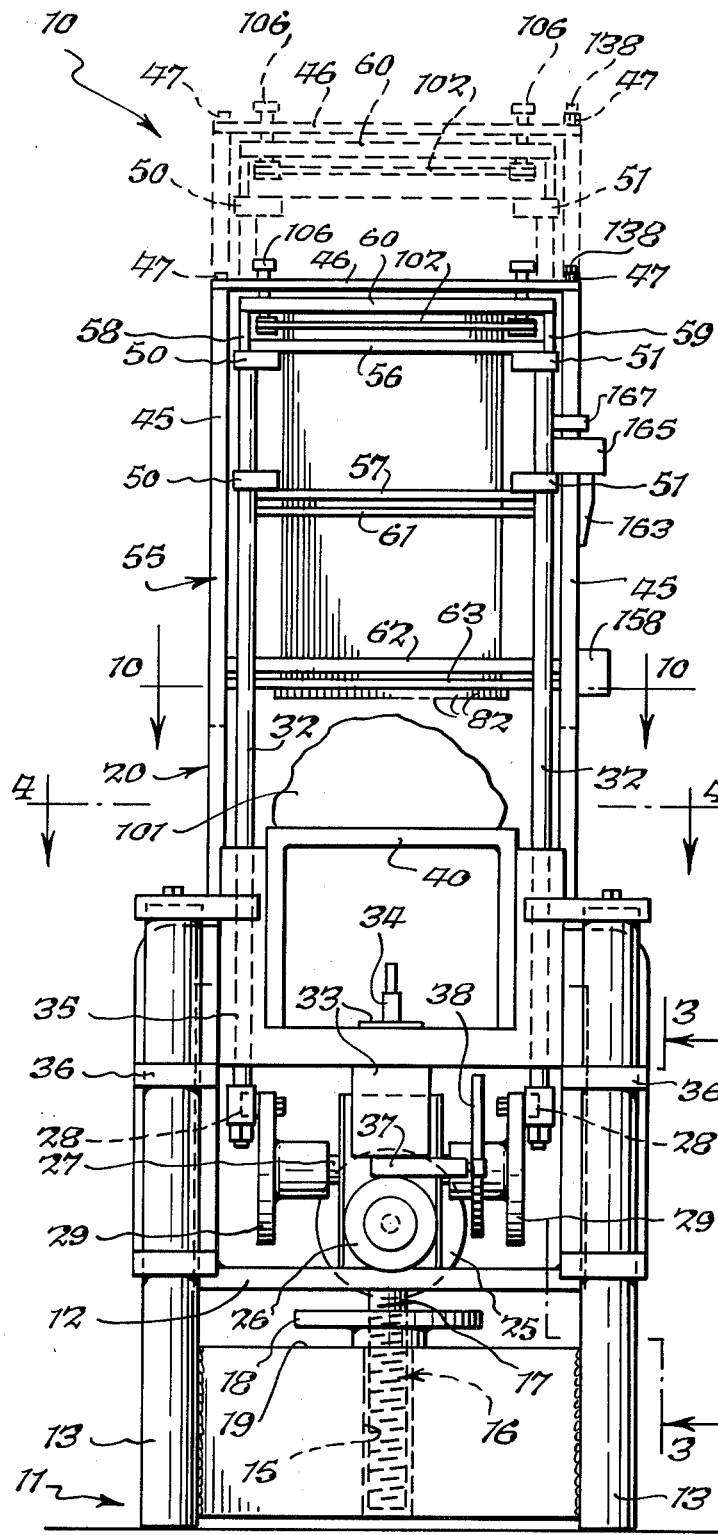
Fig. 1.
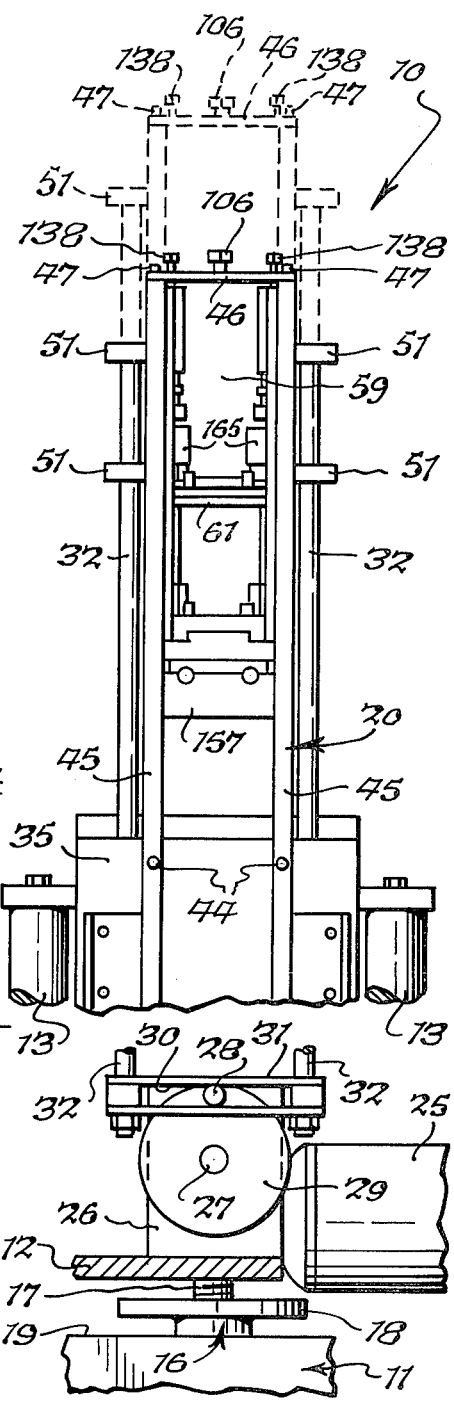
Fig. 2.
Fig. 3.

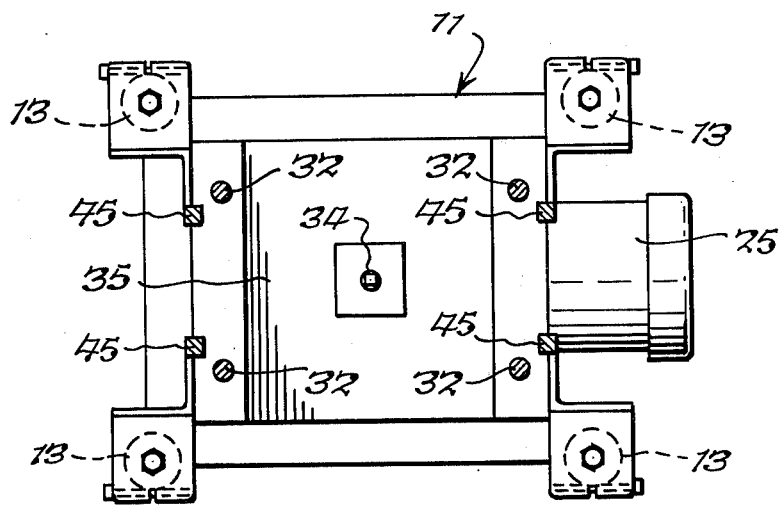
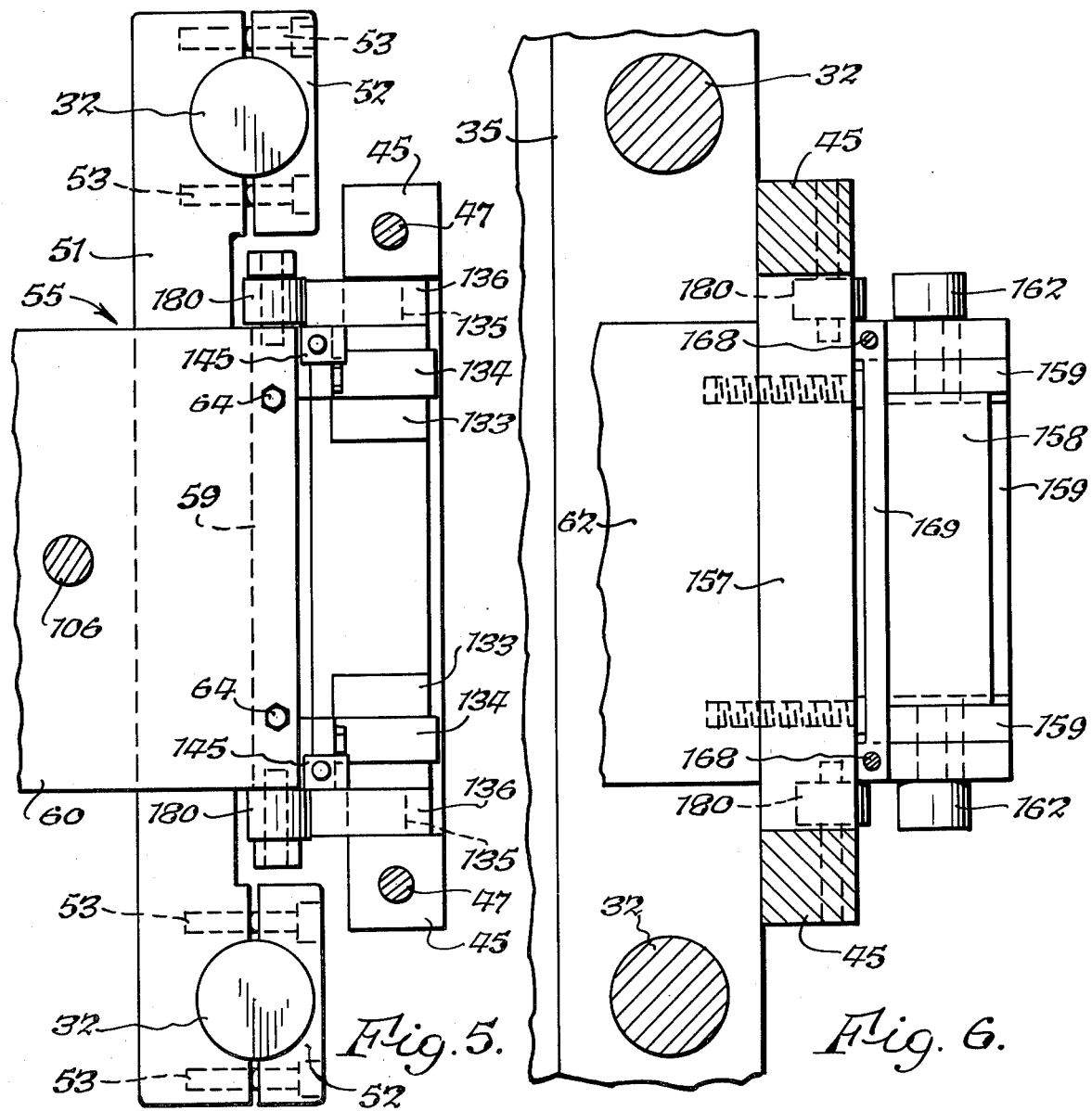
Fig. 4.
Fig. 5.
Fig. 6.

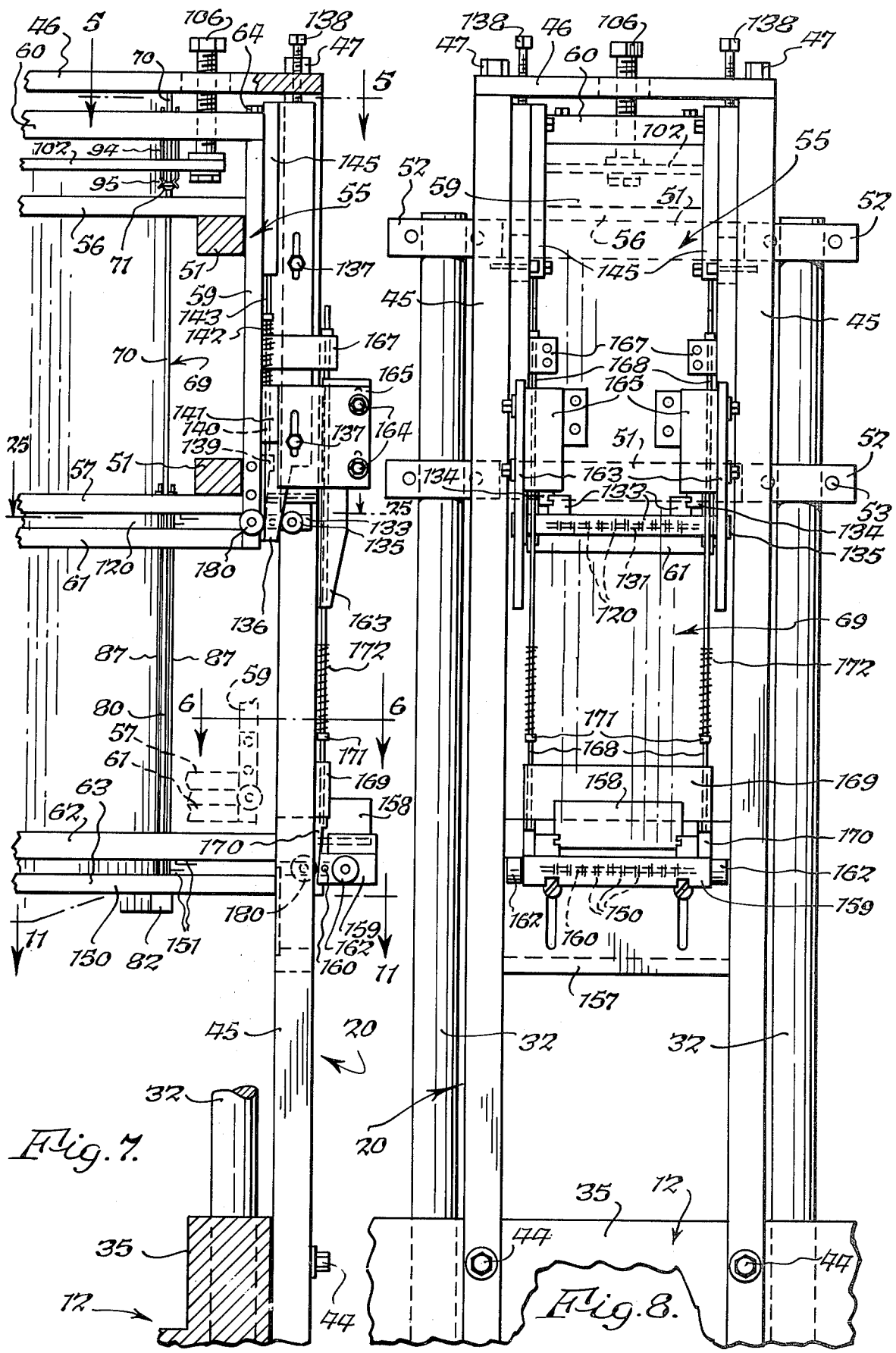

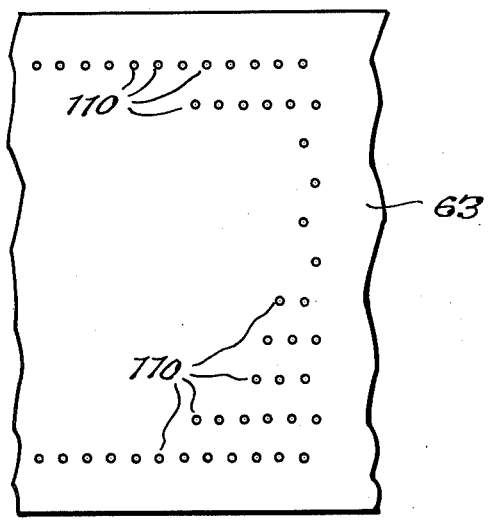
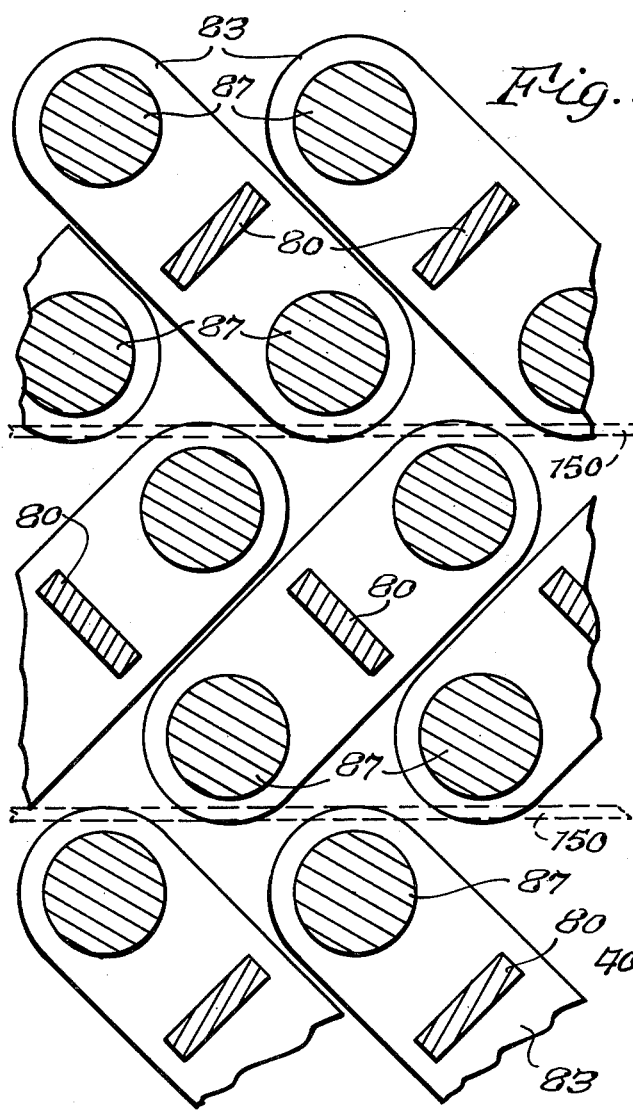
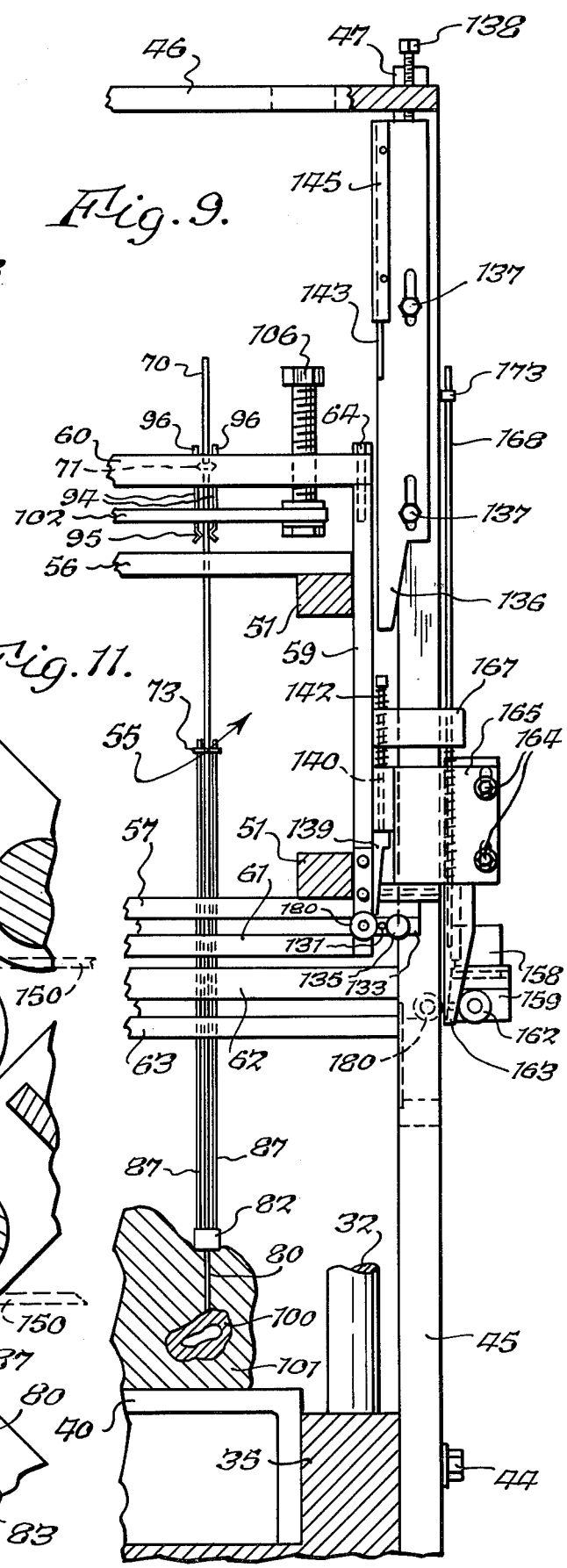

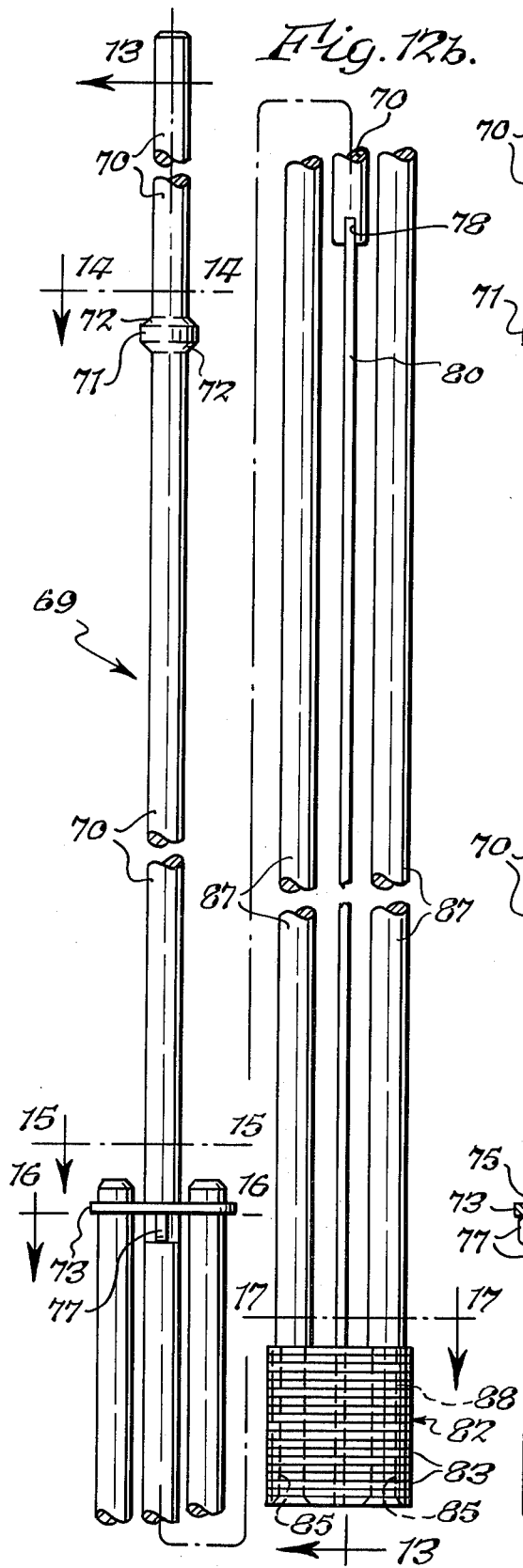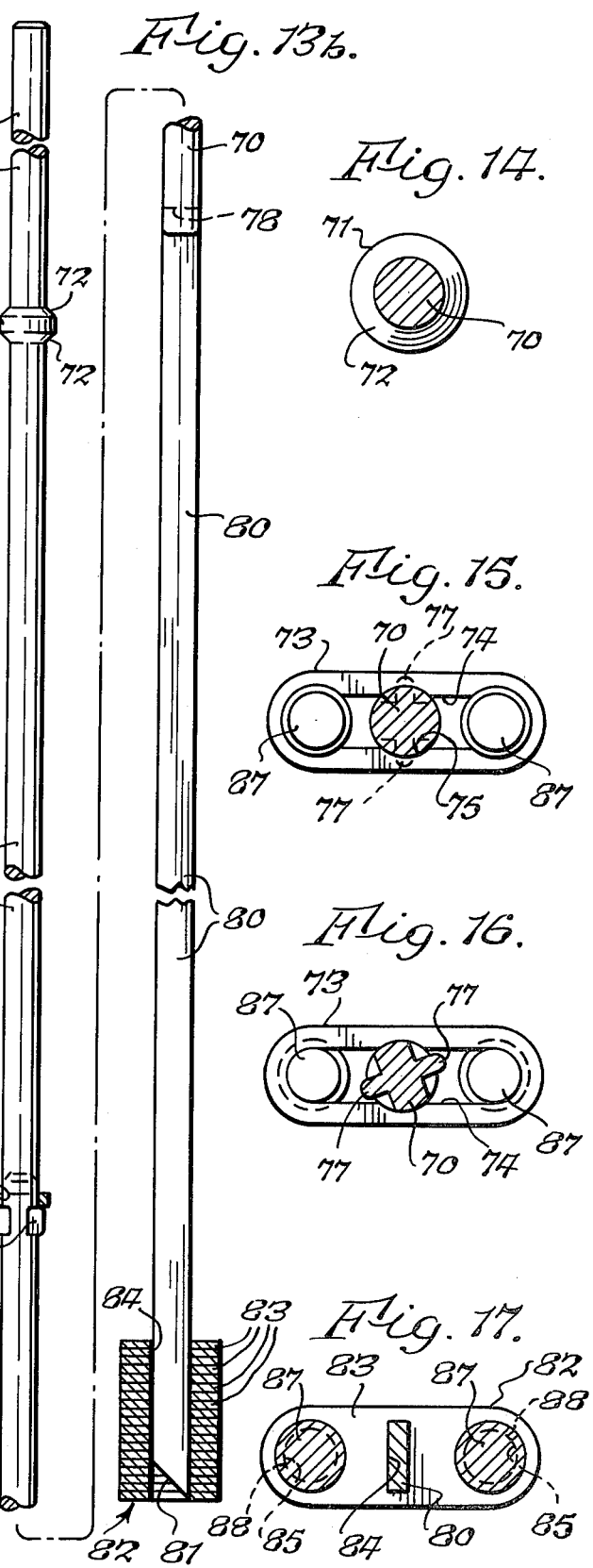

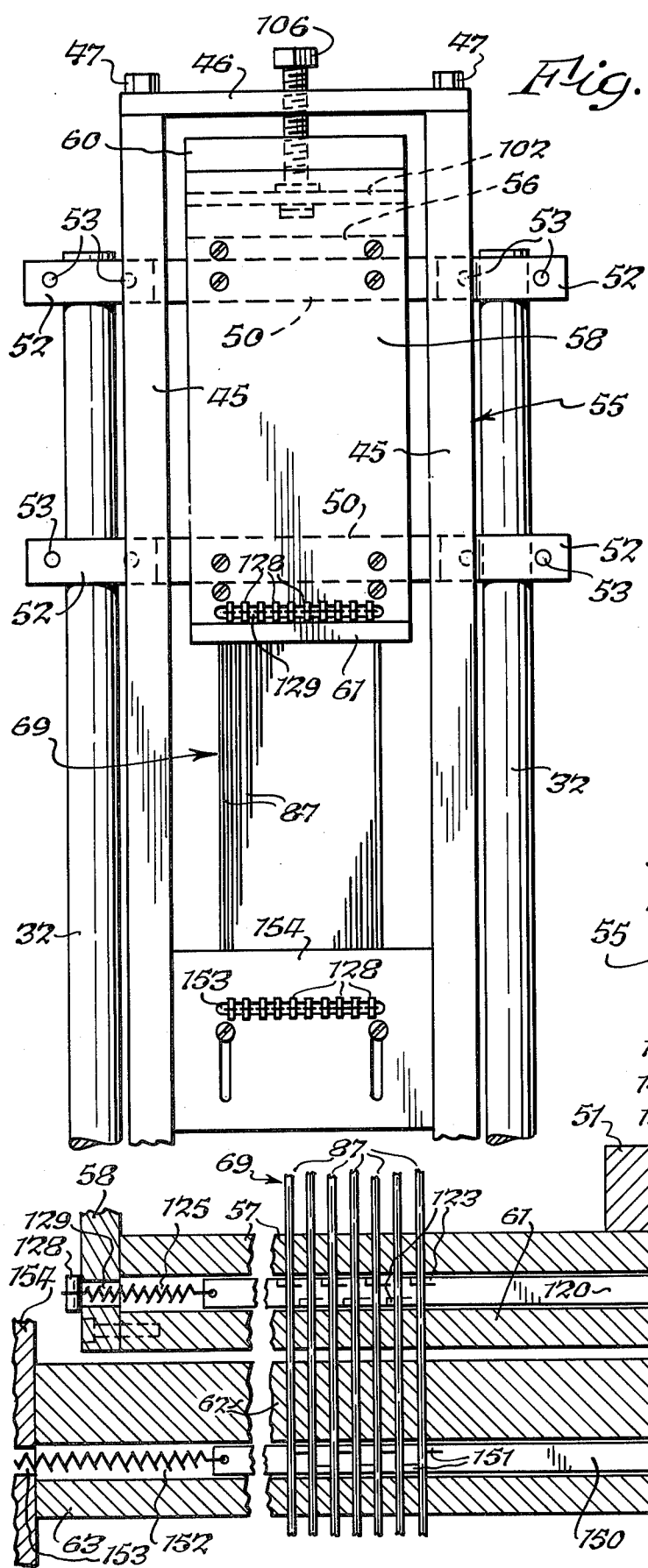
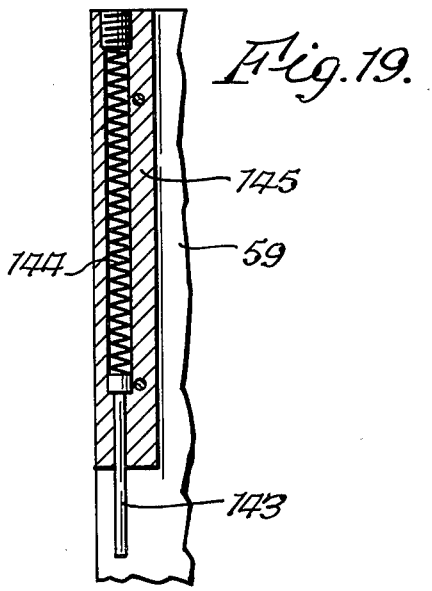
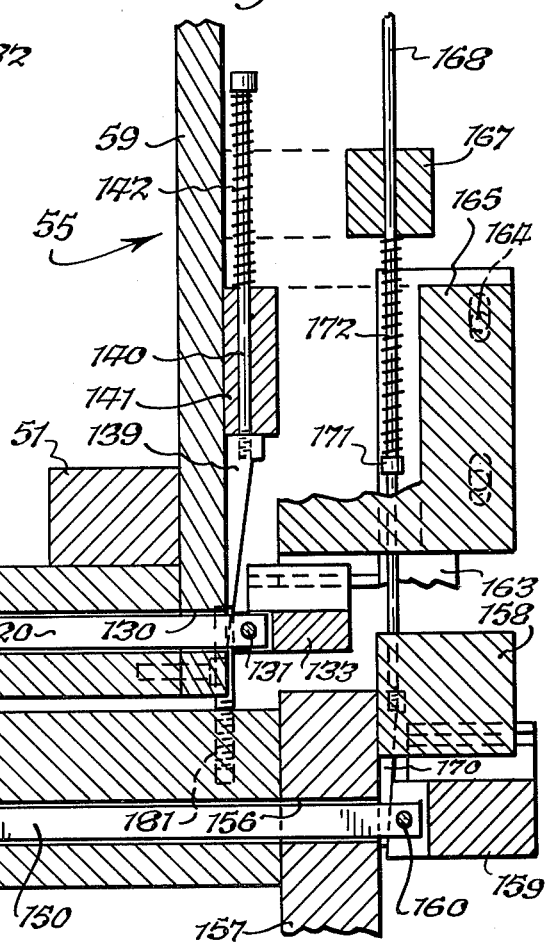
Fig. 18.
Fig. 19.
Fig. 20.

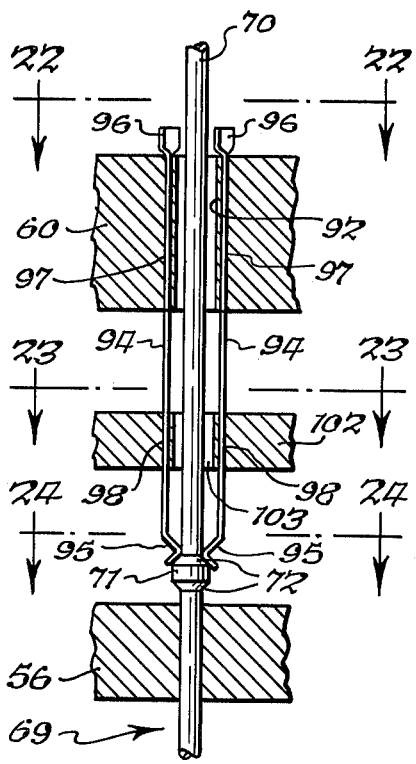
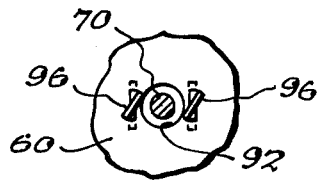
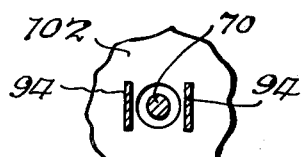
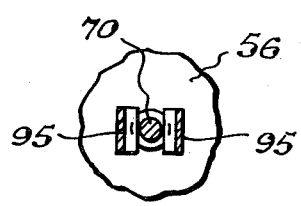
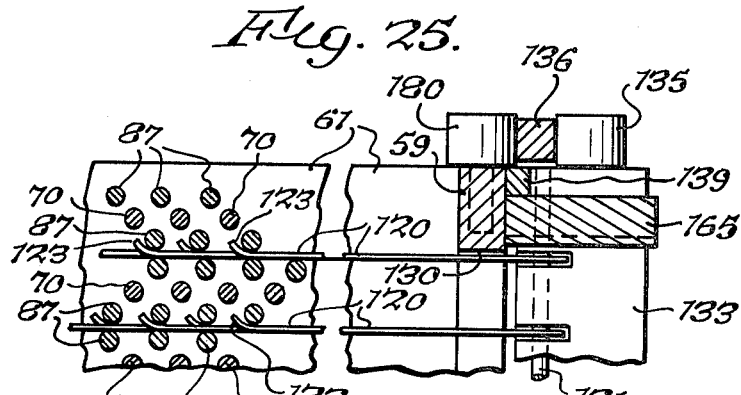
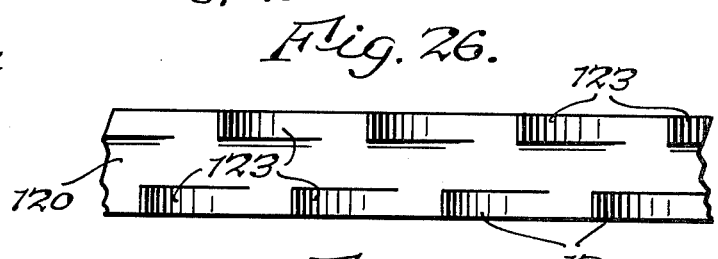
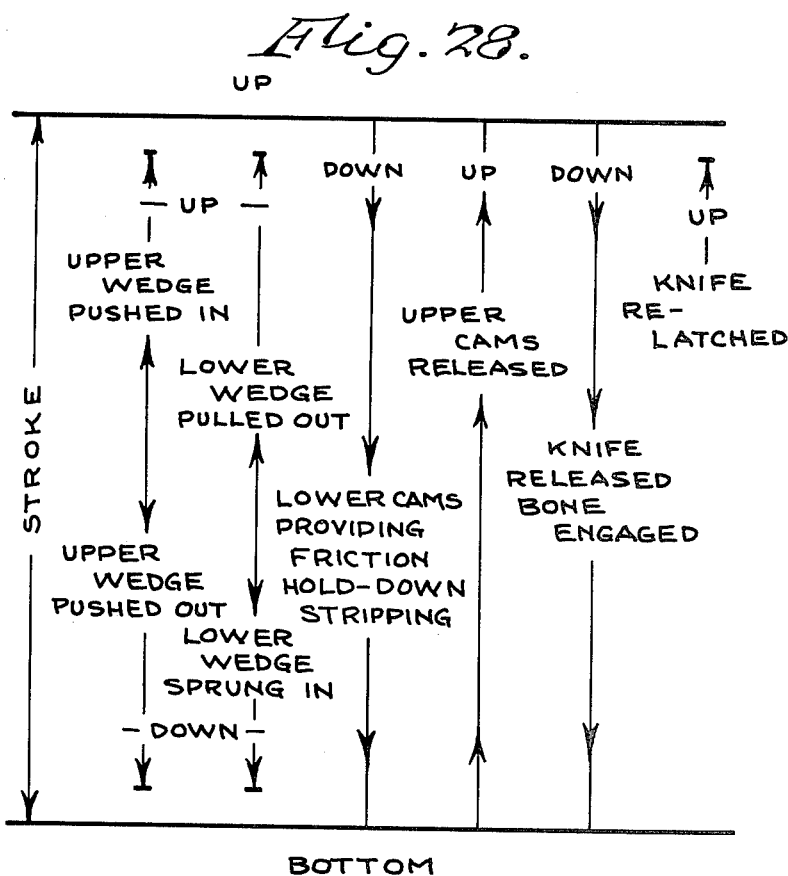

MEAT TENDERIZING APPARATUS

BACKGROUND OF THE INVENTION

The present invention relates to meat tenderizing apparatus and is particularly concerned with such apparatus which can be used in tenderizing meat cuts which contain bones.

The tenderizing of meat by either chemical and/or mechanical means is now quite common because the supply of meat which is naturally adequately tender is far smaller than the demand. While injection with suitable tenderizing chemicals is extensively used, there is widespread opposition to the use of chemicals in foodstuffs and consequently mechanical tenderizing is favored by many meat suppliers and consumers. Many machines for mechanical meat tenderizing have been designed and are available. For example, U.S. Pat. No. 3,283,360 to Tamain discloses a convenient and efficient machine for this purpose. In this machine and others, long, thin, knife blades are repeatedly thrust into a meat cut, thus making a large number of incisions and severing the tough connective tissues in the meat cut at a large number of points therein.

It has been found, however, that the use of such machines is limited by the fact that they can only be employed with cuts of meat that do not contain bones. Since the long, thin, piercing elements or knives are rigidly held to permit forcing them into the meat cut, they are easily bent or broken if they encounter anything hard, such as a bone, in the meat. Not only does this render the tenderizing apparatus inoperative, but it may result in sharp metal fragments being left in the meat cut, with consequent danger for a consumer. Moreover, the stripping plates used do not operate very satisfactorily with meat cuts that are uneven in thickness.

Accordingly, attempts have been made to provide machines for meat tenderizing in which the piercing elements are protected against breakage in the event a bone or other hard object is encountered in the meat. In some instances, the individual piercing elements have been separately or independently mounted so that all of the elements need not move together under an applied force and if one or more elements meets with more than a predetermined amount of resistance in penetrating the meat cut, the force applied to such element or elements may be diminished or discontinued. It has, however, been found that the available machines of this type are not entirely satisfactory.

It is an object of the present invention, therefore, to provide meat tenderizing apparatus that can be satisfactorily and safely employed with meat cuts regardless of whether they contain bones or other hard objects or material and whether the thickness of the cut is uniform.

It is a further object of the invention to provide a construction for tenderizing apparatus which is simple and requires little attention.

SUMMARY OF THE INVENTION

The foregoing objects are achieved by apparatus for meat tenderizing which comprises ram mechanism carrying an assembly of meatpiercing elements. The ram mechanism and piercing elements are mounted for vertical reciprocation with respect to a meat cut. Each piercing element has individual stripping means for guiding the element and for holding the meat while the element is withdrawn from the meat after insertion therein. The meat-piercing elements have mountings which permit any one or more thereof to be released during downward movement of the ram mechanism in the event such element or elements encounters a hard material such as bone which can not be penetrated by the element. The stripping means for each element is frictionally held so as to accompany the element in downward movement of the ram mechanism until each of the stripping means engages the top surface of the meat. Friction means is also provided to hold the stripping means for each piercing element in contact with the meat when the element is withdrawn from the meat during upward movement of the ram mechanism.

SHORT DESCRIPTION OF THE DRAWINGS

FIG. 1 is an end elevation of meat-tenderizing apparatus according to the present invention;

FIG. 2 is a fragmentary side elevation of the upper portion of the apparatus shown in FIG. 1;

FIG. 3 is a fragmentary vertical section taken along line 3—3 of FIG. 1 showing the vertical crank mechanism;

FIG. 4 is a horizontal section taken along line 4—4 of FIG. 1;

FIGS. 5 and 6 are enlarged, horizontal, fragmentary sectional views taken on correspondingly numbered lines of FIG. 7;

FIG. 7 is an enlarged, fragmentary front view, having parts in section, of the right side portion of the apparatus shown in FIG. 1;

FIG. 8 is an enlarged, fragmentary side view of the apparatus shown in FIG. 7;

FIG. 9 is a view similar to FIG. 7 with a meat-piercing element shown penetrating the meat and engaging a bone and with operating parts in the position occupied at that phase of operation;

FIG. 10 is a hole-location diagram taken on line 10—10 of FIG. 1 showing the distribution of the piercing elements in the apparatus;

FIG. 11 is a greatly enlarged, fragmentary, horizontal section taken along line 11—11 of FIG. 7 through the piercing elements and associated stripper blocks;

FIGS. 12a and 12b are side elevations of a piercing element assembly;

FIGS. 13a and 13b are vertical sections taken along line 13—13 in FIGS. 12a and 12b, respectively;

FIGS. 14 and 15 are horizontal sectional views, taken, respectively along lines 14—14 and 15—15 in FIG. 12a.

FIG. 16 is a similar sectional view taken along line 16—16 of FIG. 12a showing a piercing element in a twisted position for release from its assembly;

FIG. 17 is another similar sectional view taken along line 17—17 of FIG. 12b;

FIG. 18 is a fragmentary view of the side of the apparatus shown in FIG. 1 opposite to the side shown in FIG. 8;

FIGS. 19 and 20 are fragmentary sections through some of the piercing element friction control mechanisms;

FIG. 21 is a fragmentary, enlarged, sectional view of the upper end of a piercing element showing the piercing element release mechanism;

FIGS. 22, 23 and 24 are cross sectional views taken along correspondingly numbered lines in FIG. 21;

FIG. 25 is a fragmentary, enlarged, horizontal sectional view taken along line 25—25 of FIG. 7;

FIG. 26 is a fragmentary, enlarged, side view of a spring friction strip;

FIG. 27 is a fragmentary, top plan view of the spring friction strip shown in FIG. 26; and FIG. 28 is an operation graph of various phases of the operation of the apparatus during one cycle of operation.

THE INVENTION

The meat tenderizing apparatus of the illustrated embodiment of the present invention, which is comprehensively designated 10, comprises a generally rectangular base 11 having four upstanding posts 13. The base 11 is adapted to be placed on a firm, flat surface, such as a floor, and a secondary base 12 is slidably mounted on the posts 13, above the base 11. Adjustment of the vertical position of the secondary base 12 is provided by a threaded screw jack 16 carried by and depending therefrom. The free end of the screw 17 of the jack 16 is received in an orifice 15 in the machine base 11 and a hand wheel 18 threadedly engaged with the screw 17 is supported on the upper surface 19 of the base 11. The vertical position of the secondary base 12 may thus be adjusted, by operation of the wheel 18, to allow the meat cut to be positioned at a convenient level and to permit the use of the apparatus with a conveyor run in a production line.

The secondary base 12 has a body portion 35 which is provided with outwardly projecting guide rings 36 slidable on the posts 13 and which supports a carriage 20 movable therewith in which there is mounted a ram mechanism hereafter described. Beneath the body portion 35 there is located drive mechanism for reciprocating said ram mechanism. The drive mechanism comprises an electric motor 25, which, through a speed reducer 26, drives a main shaft 27 having on opposite ends thereof crank discs 29, each of which carries, adjacent its periphery, an outwardly projecting crank roller 28. Each roller 28 rides in a crank slot 30 of a cross head 31 to which a pair of upwardly extending push rods 32 are attached. The push rods 32 are slidable in the body portion 35 so that they may be reciprocated by the crank rollers 28 and cross heads 31. At the left and right sides, respectively, of the apparatus, the push rods 32 are connected in pairs by a pair of vertically spaced cross bars 50 and a pair of vertically spaced cross bars 51. The cross bars 50 and 51 are secured to their respective rods 32 by clamping members 52 and screws 53.

Extending vertically upward from the body portion 35 and attached thereto at opposite sides, as by bolts 44, are two pairs of spaced posts 45. These, at their upper ends support the cover plate 46 of the carriage 20 and are suitably attached thereto, as by bolts 47.

As will be best seen from FIG. 7, the upper cross bars 50,51 have secured to their upper faces a perforated guide plate 56 and the lower cross bars 50,51 have secured to their lower faces a second perforated guide plate 57. Vertical head plates 58 and 59 are respectively secured on the left and right outer side faces of the cross bars 50,51, the head plates extending somewhat above the guide plate 56 and below the guide plate 57. A perforated top guide plate 60 is suitably secured on the upper ends of the head plates 58 and 59, as by screws 64, and a third perforated guide plate 61 is secured to the head plates at their lower extremities. The plates 56 and 57, 60 and 61, together with the cross bars 50 and 51 and head plates 58 and 59, comprise a ram mechanism 55 which is reciprocable by the motor 25 through the crank rollers 28 and push rods 32 and which carries a plurality of elongated meat-piercing elements and guide means and strippers therefor, to be hereinafter described. The piercing elements and strippers are guided at their lower ends in aligned orifices or perforations in vertically spaced, horizontal guide plates 62 and 63 which are suitably attached to and carried by the posts 45. The piercing elements may be of any desired length whereby to permit penetration of meat cuts of various thicknesses.

As best shown in FIGS. 12a, 12b, 13a, and 13b, each of the meatpiercing elements, comprehensively designated 69, employed in the tenderizing apparatus of the present invention comprises a drive rod 70 of curved, preferably cylindrical, cross section which, adjacent its upper end, is provided with a preferably integral, annular enlargement or button 71 having upper and lower annular beveled portions 72. Adjacent its lower end, the rod 70 passes through a transverse guide link 73 which is provided with a longitudinal slot 74 having a central, arcuate enlargement 75 in which the rod 70 is slidable. Stops 77 are provided on the drive rod 70 to arrest passage of the rod through the link 73 in an upward direction, as shown in FIGS. 12a, 13a, and 15. The stops 77 may be formed by pinching the rod 70 to deform it, thereby causing the stops to protrude.

The lower end of the drive rod 70 is provided with a slot 78 in which the upper end of a slender, sharpened, flat blade 80 is suitably secured, for example by brazing. The blade 80 is preferably rectangular in cross section and the lower end thereof terminates in an oblique cutting edge 18. The lower portion of the blade 80 is guided in a stripper block 82 which is built up from a plurality of flat, elongated stampings 83 which have registering, central, rectangular openings 84 therein in which the blade 80 is slidably received. The stampings 83 also have, adjacent their ends, aligned holes 85 in which reduced end portions 88 of a pair of guide rods 87 are suitably secured. The rods 87, which at their upper ends are held in the arcuate ends of the slot 74 in guide line 73, serve to hold together the guide plate 73 and the stripper block 82, with the holes 75 and 84 aligned. Thus, the piercing element 69 is supported and guided for vertical, straight line movement along a substantial portion of its length. As shown in FIG. 16, the piercing element 69 can be removed from the stripper block 82 and the associated guide assembly i.e. rods 87 and line 73, by twisting it so as to disengage the stops 77 on the rod 70 by turning them into the slot 74. The element 69 can then be separated by pulling it from the stripper block 82 and through the line 73. It can, of course, be reassembled with the stripper block and guide assembly by reversing the procedure.

FIG. 21 illustrates in detail the means by which a piercing element 69 is individually and releasably held in operative position, i.e. in position for penetration of a meat cut. As will be seen therein, the upper end of the element 69 projects through an orifice or perforation 92 in the top plate 60 of the ram mechanism 55. Supported in holes 97 in the plate 60, closely adjacent to the element 69, are spring fingers 94. These extend downwardly on opposite sides of the element 69 and at their lower ends are provided with inturned V-shaped tips 95 which abut the top bevelled portion 72 of the button 71 on the drive rod 70. Each of the fingers 94 is provided with shoulders that abut the lower face of the plate 60 and has its protruding upper end twisted, as shown at 96, to anchor it in the holes 97. The fingers are urged together, by tensioning means hereinafter described, sufficiently to provide a driving force on the rod 70 by the tips 95 when the ram mechanism moves downwardly. Such force is sufficient to push the associated blade 80 into a cut of meat. However, as shown in FIG. 9, in the event the blade 80 encounters abnormal resistance in movement toward or into said cut, e.g. a bone 100 or other hard material in the meat 101, the additional resistance offered to penetration thereby will cause the button 71 to cam the finger tips 95 apart so that the drive rod 70 can slide upwardly, whereby breaking or bending of the blade will be avoided.

As best shown in FIG. 9, a tensioning plate 102 is provided between the top plate 60 of the ram mechanism 55 and the guide plate 56 to adjust the pressure of the tips 95 of the fingers 94 against the drive rods 70. The plate 102 has perforations or orifices 103 of such size as to allow passage therethrough of the buttons 71 on the rods 70 and is supported from the plate 60 at opposite ends thereof of screws 106, the lower ends of which are secured to the tensioning plate 102. The plate 102 also has holes 98 for the fingers 94 and when lowered or raised shortens or lengthens their effective lengths, thus increasing or decreasing the force they exert on the rods 70 and correspondingly, increasing or decreasing the force needed to release a piercing element 69 if the blade thereof encounters abnormal resistance.

As will be evident, a large number of piercing elements are employed simultaneously in the meat tenderizing apparatus of the present invention. Consequently, the plates 60, 102, 56, 57, and 61, which in operation are vertically reciprocated by the cross heads 31 and push rods 32, as well as the guide plates 62 and 63 which are fixed, by suitable means, to the supporting posts 45 of the carriage 21 and serve as guides for the piercing elements 69 and guide rods 87, are all provided with a plurality of vertically registering or aligned orifices or perforations for a plurality of piercing elements 69, together with their associated structure where necessary. In FIG. 10, there is depicted a portion of a guide plate, e.g. plate 63, the holes 110 therein being located on the center lines of the piercing elements 69 and guide means associated therewith. Such an arrangement and spacing of holes is also found in the other guide plates. In order to obtain a compact arrangement of piercing elements 69, guides, and stripper blocks, the blades 80 and stripper blocks 82 are preferably, as shown in FIG. 11, arranged vertically in a plurality of rows. In each of said rows the elements are positioned with the flat portion thereof parallel and with the said flat portions in adjacent rows positioned at a horizontal angle of 90°. When thus clustered, a great number can be accommodated in a relatively small area. For example, approximately 500 piercing elements and strippers can be located in a space 28 cm×10 cm.

In tenderizing a cut of meat 101 the ram mechanism 55 is lowered so that the piercing elements 69, the stripper blocks 82, and the guide rods 87 all move toward the meat cut. The stripper blocks contact the upper surface of the meat cut and guide the blades 80 so that they penetrate the meat, without bending, for the desired distance or until one or more of them encounters a bone or the like. Upon reversal of the direction of movement of the ram mechanism 55, the stripper blocks are releasably held down against the meat surface while the associated blades 80 are withdrawn, thus preventing tearing of the meat. As indicated above, in the event one or more of the blades 80 encounters a bone or other impenetrable object in the meat, the button 71 on the drive rod 70 of that blade or blades exerts pressure on the tips 95 of spring fingers 94, spreading the fingers apart, whereby downward pressure on the guide rod is relieved and the blade is not further forced against the bone. The blade thus is not bent or broken.

As is best seen in FIGS. 20 and 25, friction means is employed to hold the meat-piercing elements 69 and stripper blocks 82 together during downward movement of the ram mechanism 55 and other friction means is employed to hold down the blocks 82 during upward movement of the blades 80 in withdrawing from the meat 101. Such first-mentioned friction means comprises a set of parallel, spring metal, friction strips 120 located between the lower guide plates 57 and 61 of the ram mechanism 55 and extending between the vertical head plates 58 and 59 through the bank of piercing elements 69 and guide rods 87. As is best shown in FIGS. 25-27, each of the friction strips 120 is cut and bent at intervals along its upper and lower longitudinal edges to provide a plurality of spring tangs 123 that project laterally and can be frictionally engaged with adjacent guide rods 87 to increase resistance to vertical movement of the latter with respect to the piercing elements 69. It will be clear from FIG. 25 that, as a spring tang 138 on the strip 120 engages a rod 87 on one side of the strip, the main body of the strip will be pressed against one of the rods 87 on the other side of the strip, thus increasing the frictional resistance to vertical movement of both of the rods. Because of such resistance the guide rods and the stripper blocks 82 carried thereby move downwardly with the elements 69 as the latter are pushed down by the buttons 71.

At their left ends, as viewed in FIG. 20, each of the friction strips 120 is attached to a tension spring 125 which extends through a horizontal slot 129 in the head plate 58 and is secured, outwardly thereof, to an anchor pin 128. Thus the strips 120 are resiliently biased to the left, as viewed in FIG. 20, and the tangs 123 do not exert pressure against the guide rods 87 when in that position. The strips 120 extend at their right ends through a slot 130 in the head plate 59 and are attached by a rod 131 to a pull block 133, that slides in a guide block 134. Rotatable cam followers 135 are mounted on the opposite ends of the pull block 133. When the ram mechanism 55 is in its top position, as shown in FIG. 7, the cam followers 135 are engaged by stationary cams 136 suitably mounted, as by screws 137, for vertical adjustment on the right-hand vertical supporting posts 45 of the carriage 20. Stop screws 138 are mounted in the plate 46 to limit upward movement of the cams 136. The pull block 133 and the attached friction strips 120 are thus shifted to the right (FIG. 7) and the tangs 123 on the latter are brought into frictional contact with the adjacent guide rods 87.

A pair of wedges 139 is provided for engagement with the pull block 133, as hereinafter described. Each of the wedges 139 is suitably attached to the lower end of a vertical push rod 140 that is slidably mounted in a block 141 carried by the vertical head plate 59, inwardly from the cam followers 135. The push rods 140 and wedges 139 are normally held in raised position by coil springs 142 interposed between the blocks 141 and the headed tops of the rods 140.

As the ram mechanism is moved upwardly by the push rods 32 and approaches its top position, and after the cam followers 135 are moved outwardly by the cams 136, the top of each of the rods 140 engages a springloaded detent which comprises an aligned vertical rod 143 loaded by a coil spring 144 and slidable in a block 145 suitably mounted on a post 45 above the cam 136. The springs 144 of the detents are less easily compressed than the springs 142 and the wedges 139 are thus forced behind the pull block 133. There they maintain the friction strips 120 in position whereby the tangs 123 thereof frictionally engage with the adjacent guide rods 87 when the cams 136 disengage from the cam followers 135 as the ram mechanism 55 moves downwardly. As a result, when the ram mechanism 55 moves downwardly the piercing elements 69 and stripper blocks 82 also move downwardly, the former as a result of pressure by the tips 95 of spring fingers 94 on the buttons 71, and the latter by frictional engagement between the guide rods 87 and the friction strips 120.

A plurality of parallel, spring metal, friction strips 150, which constitute the second friction means referred to above, are provided between the stationary perforated guide plates 62 and 63. The strips 150 are substantially identical with the friction strips 120 and function generally in the same manner but are adapted to apply friction on the guide rods 87 of the piercing elements 69 and stripper blocks 82 during initial upward movement of the ram mechanism 55. Each of the friction strips 150 is provided with laterally protruding tangs or spring fingers 151 and is normally biased to the left, as viewed in FIG. 20, by a tension spring 152 attached thereto and passing through a slot 153 in a vertical frame plate 154 that is suitably attached to the vertical posts 45 at the left side of the machine. The springs 152 are secured at their outer ends by anchors 128. At their other, right, ends the strips 150 project through a slot 156 in a vertical frame plate 157, suitably mounted opposite the plate 154 on the other vertical supporting posts 45, and are attached to a pull block 159 by a rod 160. The ends of the pull block 159 are provided with rotatable cam followers 162 and the block 159 is slidably guided by a member 158.

Adjacent its lower end, the ram mechanism 55 is provided with a pair of laterally spaced, downwardly projecting cam members 163, each of which is suitably secured, as by screws 164, on a bracket 165 upon which it is vertically adjustable. The bracket 165 is suitably attached to the head plate 59. The cam members 163 are adapted to engage the cam followers 162 to move the pull block 159 and friction strips 150 to the right, whereby to apply friction to the guide rods 87 on either side of and adjacent to the latter. Also suitably secured to the head plate 59, above the brackets 165 are blocks 167 in each of which is slidably mounted a push rod 168. The latter carry at their lower ends wedges 170 adapted to cooperate with the pull block 159 as hereinafter described. Each of the push rods 169 is provided with an adjustable collar 171 below the block 167 and a coiled compression spring 172 surrounding the rod and resting on the collar. Another collar 173 is adjustably mounted adjacent the upper end of each push rod 168. When the cam members 163 move the pull block 159 to the right, the springs 172 push the wedges 170 between the pull block and the plate 157, thus maintaining the friction strips 150 in engagement with adjacent guide rods 87 even when the cam members 163 are withdrawn as the ram mechanism is raised, whereby to hold the stripper blocks 82 in contact with the meat as the piercing elements are withdrawn.

In summary, the operation of the meat-piercing elements and friction strips is as follows: Starting with a cut of meat under the ram assembly and the latter in its top position, as in FIG. 7, the stationary cams 136 and the wedges 139 hold the friction strips 120 in frictional engagement with the guide rods 87 adjacent thereto and the tips 95 of spring fingers 94 engage the buttons 71 on drive rods 70. As the ram mechanism moves downwardly, the piercing elements and their guide rods are moved downwardly together until the stripper blocks 82 on the latter make contact with the surface of the meat cut and stop. The piercing elements continue their motion until they penetrate for the desired distance into the meat or alternatively, strike an obstacle such as a bone. In the latter event, the button 71 on the piercing element involved spreads the spring fingers 94 associated therewith and the element is released without further penetration. As the ram mechanism approaches the bottom of its travel (indicated by the fragmentary broken line showing in FIG. 7), the cam members 163 engage the cam followers 162, thereby moving the friction strips 150 into frictional engagement with guide rods 87, and the springs 172 cause wedges 170 to engage behind the pull block 159. At the same time, the lower ends of the wedges 139 engage the stop screws 181 which are adjustably secured in and projecting from the orifice plate 62 and are pushed upwardly to disengage them from the pull block 133, thus releasing the friction strips 120 which are disengaged from the guide rods by the springs 125.

As the ram mechanism moves upwardly, the piercing elements 69 are withdrawn from the meat by the guide plate 56 engaging the buttons 71 thereon or, if as shown in FIG. 9 a piercing element has encountered a bone, by the spring fingers 94 engaging said button. While the elements 69 are being withdrawn the friction strips 150 frictionally hold the guide rods 87 so that the stripper blocks 82 continue in contact with the meat surface until the guide links 73 are engaged by the guide plate 57 to retract them. As the ram mechanism 55 approaches its upper limit of travel the blocks 167 carried thereby move the upper collars 173 on the push rods 168 upwardly, thus disengaging the wedges 170 and permitting the springs 152 to shift the friction strips 150 out of engagement with the guide rods 87. At the same time the stationary cams 136 have engaged the followers 135 to again move the friction strips 120 into frictional engagement with the guide rods 87 for the next cycle of operation. Preferably, back up rollers 180 are provided to reduce friction in the operation of the cam members 136 and 163. Any piercing element 69 that has been disengaged and raised (see FIG. 9) as a result of encountering a bone will, as the ram 55 reaches its topmost position, be restored to operative position by contact of the drive rod 70 with the plate 46.

In FIG. 28 there is shown graphically the relationship of the several actions taking place during a single cycle of upward and downward movement of the ram mechanism.

As is indicated above, a meat cut 101 to be tenderized can be supported on a platform 40 carried by the body portion 35 of the secondary base 12 and be moved by hand between strokes of the ram mechanism so as to change the location of the incisions produced by the piercing elements. It is also contemplated that a conveyor flight (not shown) can be used to permit the automatic feeding of cuts of meat to the tenderizing apparatus and the shifting of such cuts between strokes.

Provision for such a conveyor is made by providing a rotary cam 38 on one of the crank discs 29 which cam, in rotating, operates a cam lever 37 to produce rotary movement of the shaft 34 carried in the bearing 33. Through suitable mechanism (not shown) such movement of the shaft can produce intermittent travel of a conveyor.

It will be clear from the foregoing description that the present invention provides a meat tenderizing machine which operates conveniently and efficiently. The machine has individual guiding means and stripping means for each of the piercing elements and the piercing elements are so mounted that if one of them encounters a bore or other hard material in the meat it penetrates no farther and thus bending or breaking of the elements is prevented. Moreover, since the stripper blocks 82 are separate and independently movable, the stripper block for each of the several piercing elements will engage the surface of the meat cut being operated on, even through the cut is irregular in thickness, e.g. substantially triangular in shape. Such engagement results in each of the piercing elements being guided by its stripper block at the point of entry of said element into the meat cut. Deflection and resultant bending and/or breaking of the elements by a tough skin or other surface abnormality of the meat is thus also prevented. The machine is adapted to be operated automatically and can be used with meat cuts of a wide size range.

In the use of the machine, a cut of meat to be tenderized is placed on a platform 40 or on a suitable conveyor extending between the push rods 32 while the ram mechanism is in the upper, normal position shown in FIG. 1. The ram mechanism is then repeatedly lowered to cause a penetration of the meat cut by the piercing elements 69, the meat being preferably moved between strokes of the ram mechanism to cause incisions to be made at different points in the meat. The meat cut can be moved either by hand or by a conveyor, if one is provided.

It will be understood that suitable electrical connections to the motor 25 will be provided and that suitable control devices will also be provided which will permit intermittent or continuous cycling of the ram mechanism 55 as desired.

Although any suitable metal can be used in constructing the machine of the present invention, it is preferred to form the meat-contacting portions thereof of stainless steel thus minimizing corrosion and making it easier to clean.

It will also be understood that the apparatus of the invention is subject to modification or variation and, accordingly, the invention is not to be construed as limited to the precise construction described and shown. Rather, it should be construed as broadly as permitted by the accompanying claims.

I claim:

1. Meat tenderizing apparatus comprising: an assembly comprising a plurality of individual meat-piercing elements; means for supporting and moving a plurality of said elements; means for supporting a cut of meat; means for reciprocating said supporting and moving means toward and away from said meat; individual means for separately guiding each of said piercing elements; separate stripping means carried by each of said guiding means for holding said meat while said piercing elements penetrate said meat and are withdrawn therefrom; each said guiding means being carried by and slidably movable with respect to its associated piercing element.

2. Meat tenderizing apparatus comprising: an assembly comprising a plurality of individual meat-piercing elements; means for supporting and moving a plurality of said elements; means for supporting a cut of meat; means for reciprocating said supporting and moving means toward and away from said meat; individual means for separately guiding each of said piercing elements; separate stripping means carried by each of said guiding means for holding said meat while said piercing elements penetrate said meat and are withdrawn therefrom; each said guiding means being carried by and slidably movable with respect to its associated piercing element and comprising a pair of spaced rods connected at their tops by a guidelink slidable on said associated piercing element.

3. Meat tenderizing apparatus as defined in claim 2, wherein said supporting and moving means comprises a plurality of vertically spaced guide plates each of which has laterally spaced orifices in which said piercing elements are slidable.

4. Meat tenderizing apparatus as defined in claim 2 wherein said supporting and moving means carries friction elements movable into frictional engagement with said rods to cause said piercing elements and said rods to move together toward said meat.

5. Meat tenderizing apparatus as defined in claim 4 wherein said friction elements are supported by one of said guide plates.

6. Meat tenderizing apparatus as defined in claim 2 wherein said apparatus comprises a pair of vertically spaced plates having spaced orifices therein in which said piercing elements are slidable, said pair of plates being fixed with respect to said supporting and moving means; and a plurality of friction elements mounted between said plates and movable into engagement with said rods to frictionally hold said rods during withdrawal of said piercing elements from said meat.

7. Meat tenderizing apparatus as defined in claim 3 wherein said apparatus comprises a pair of vertically spaced plates having spaced orifices therein in which said piercing elements are slidable, said pair of plates being fixed with respect to said supporting and moving means; and a plurality of friction elements mounted between said last mentioned plates and movable into engagement with said rods to frictionally hold said rods during withdrawal of said piercing elements from said meat.

8. Meat tenderizing apparatus as defined in claim 4 wherein said apparatus comprises a pair of vertically spaced plates having spaced orifices therein in which said piercing elements are slidable, said pair of plates being fixed with respect to said supporting and moving means; and a plurality of friction elements mounted between said plates and movable into engagement with said rods to frictionally hold said rods during withdrawal of said piercing elements from said meat.

9. Meat tenderizing apparatus as defined in claim 5 wherein said apparatus comprises a pair of vertically spaced plates having spaced orifices therein in which said piercing elements are slidable, said pair of plates being fixed with respect to said supporting and moving means; and a plurality of friction elements mounted between said last mentioned plates and movable into engagement with said rods to frictionally hold said rods during withdrawal of said piercing elements from said meat.

10. Meat tenderizing apparatus comprising a plurality of elements adapted to pierce a cut of meat, means for moving a plurality of said elements simultaneously toward and into said meat cut and for withdrawing a plurality of said elements simultaneously from said meat cut, each of said elements having associated therewith individual means for guiding said element and individual means for holding said meat cut during withdrawal of said element therefrom, each of said guiding means comprising a pair of guide rods in slidable relation to its associated element.

11. Meat tenderizing apparatus as defined in claim 10 wherein each of said holding means comprises a stripper block attached to said pair of guide rods in each of said guiding means.

12. Meat tenderizing apparatus comprising an assembly comprising a plurality of individual meat-piercing elements; means for supporting and moving a plurality of said elements; means for supporting a cut of meat; means for reciprocating said supporting and moving means toward and away from said meat; individual means for separately guiding each of said piercing elements; and separate stripping means carried by each of said guiding means for holding said meat while said piercing elements penetrate said meat and are withdrawn therefrom; each said guiding means being carried by and slidably movable with respect to its associated piercing element: wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

13. Meat tenderizing apparatus as defined in claim 2 wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

14. Meat tenderizing apparatus as defined in claim 3 wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

15. Meat tenderizing apparatus as defined in claim 4 wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

16. Meat tenderizing apparatus as defined in claim 5 wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

17. Meat tenderizing apparatus as defined in claim 6 wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

18. Meat tenderizing apparatus as defined in claim 7 wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

19. Meat tenderizing apparatus as defined in claim 8 wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

20. Meat tenderizing apparatus as defined in claim 9 wherein each of said meat-piercing elements is provided with means, comprising an enlargement of the shaft of said element adjacent the upper end of said shaft, which cooperates with spring fingers carried by said supporting and moving means to propel said element downwardly, but is adapted to release said element if the latter encounters a hard substance.

* * * * *